US011866010B2

United States Patent
Dessapt et al.

(10) Patent No.: US 11,866,010 B2
(45) Date of Patent: Jan. 9, 2024

(54) VEHICLE INTERIOR PANEL ASSEMBLY HAVING A STOWAGE TRAY FOR A MOBILE DEVICE

(71) Applicant: FAURECIA AUTOMOTIVE SEATING, LLC, Auburn Hills, MI (US)

(72) Inventors: Thomas Dessapt, Sunnyvale, CA (US); Cedric Ketels, White Lake, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 250 days.

(21) Appl. No.: 17/397,490

(22) Filed: Aug. 9, 2021

(65) Prior Publication Data

US 2023/0039884 A1 Feb. 9, 2023

(51) Int. Cl.
| | | |
|---|---|---|
| *B60R 7/04* | (2006.01) | |
| *H02J 7/02* | (2016.01) | |
| *B60R 16/02* | (2006.01) | |

(52) U.S. Cl.
CPC .............. *B60R 7/043* (2013.01); *B60R 16/02* (2013.01); *H02J 7/02* (2013.01)

(58) Field of Classification Search
CPC ........... B60R 7/043; B60R 7/04; B60R 11/02; B60R 2011/0007; B60N 2/793; B60N 2/79; B60N 3/002
USPC .......................... 296/37.15, 37.8, 1.09, 24.34
See application file for complete search history.

(56) References Cited

U.S. PATENT DOCUMENTS

| | | | | |
|---|---|---|---|---|
| 3,168,346 | A * | 2/1965 | Rei, Jr. .................. | B60N 2/757 297/411.33 |
| 5,337,677 | A * | 8/1994 | Peeno ..................... | A47B 13/16 248/223.41 |
| 5,390,976 | A * | 2/1995 | Doughty ................ | B60N 2/793 297/115 |
| 6,746,065 | B1 * | 6/2004 | Chan .................... | B60R 11/0235 296/37.8 |
| 9,722,456 | B2 * | 8/2017 | Lambert ................... | B60R 7/04 |
| 10,155,463 | B2 * | 12/2018 | Vander Sluis .......... | B60R 11/00 |

(Continued)

FOREIGN PATENT DOCUMENTS

| | | | | |
|---|---|---|---|---|
| CN | 105270271 A | * | 1/2016 | ............. B60N 2/753 |
| DE | 19615743 C1 | * | 9/1997 | ............. B60N 2/468 |

(Continued)

OTHER PUBLICATIONS

Heckmann Thomas Diplingde; 19615743 C1; machine translation; Sep. 18, 1997 (Year: 1997).*

(Continued)

*Primary Examiner* — Amy R Weisberg
*Assistant Examiner* — Wenwei Zhuo
(74) *Attorney, Agent, or Firm* — Reising Ethington P.C.

(57) ABSTRACT

A vehicle interior panel assembly includes an in-vehicle support substrate and a stowage tray for a mobile device. The stowage tray includes a reception surface for the mobile device, and one or more sliders configured to attach the stowage tray to the support substrate. The one or more sliders are further configured to tilt the reception surface with respect to a sowed position for the stowage tray in the support substrate. This structure for a stowage tray helps improve within vehicle integration and support more flexible usability.

15 Claims, 4 Drawing Sheets

(56) References Cited

U.S. PATENT DOCUMENTS

| | | | |
|---|---|---|---|
| 10,173,599 B2 | 1/2019 | Gaw, Jr. et al. | |
| 10,181,746 B2 | 1/2019 | Kramer et al. | |
| 10,709,249 B2 | 7/2020 | Liu | |
| 2007/0069544 A1* | 3/2007 | Sturt | B60R 7/04 296/37.8 |
| 2011/0140472 A1* | 6/2011 | Vander Sluis | B60R 11/00 296/24.34 |
| 2014/0110962 A1* | 4/2014 | Bohnenberger | B60R 7/06 296/37.12 |
| 2017/0217381 A1* | 8/2017 | Gilling | B60R 11/02 |
| 2021/0394657 A1* | 12/2021 | Johnen-Nelki | B60R 7/04 |

FOREIGN PATENT DOCUMENTS

| | | | | |
|---|---|---|---|---|
| DE | 102009009691 A1 * | 8/2010 | | B60R 7/043 |
| DE | 102016224883 A1 * | 6/2018 | | |
| FR | 2895335 A3 * | 6/2007 | | B60N 2/468 |
| WO | WO-9500360 A1 * | 1/1995 | | B60N 2/468 |

OTHER PUBLICATIONS

Ackeret Peter; WO 9500360 A1; machine translation; Jan. 5, 1995 (Year: 1995).*
Funk Andreas; DE 102016224883 A1; machine translation; Jun. 14, 2018 (Year: 2018).*

* cited by examiner

VEHICLE INTERIOR PANEL ASSEMBLY HAVING A STOWAGE TRAY FOR A MOBILE DEVICE

TECHNICAL FIELD

The present disclosure is related generally to vehicle interiors and, more particularly, to vehicle interior components having integrated mobile device storage.

BACKGROUND

Docking stations and other stowage areas for mobile devices are common in vehicles. However, they are often aftermarket add-on parts, or with more integrated docking stations, they are less adaptable for optimizing use. For example, U.S. Pat. No. 9,722,456 to Lambert et al. shows a mobile device holder that is slidably integrated within a console. However, the mobile device holder does not tilt to optimize a viewing angle, and thus may not be visually accessible to certain passengers within the vehicle. Improving accessibility of the mobile device holder, particularly with respect to passengers in a rear seating area of the vehicle, can be desirable in many situations, including with ride share vehicles or with vehicles likely to have one or more rear passengers.

SUMMARY

An illustrative vehicle interior panel assembly comprises a support substrate configured for in-vehicle operation, and a stowage tray for a mobile device. The stowage tray comprises a reception surface for the mobile device, and one or more sliders configured to attach the stowage tray to the support substrate. The one or more sliders are configured to tilt the reception surface with respect to a stowed position for the stowage tray in the support substrate.

In various embodiments, the support substrate includes a shifting top cover.

In various embodiments, deployment of the stowage tray is triggered by shifting the shifting top cover.

In various embodiments, the one or more sliders are configured to translate the stowage tray forward before tilting the stowage tray up with respect to the support substrate.

In various embodiments, the one or more sliders creates a four-bar linkage.

In various embodiments, a first bar and a second bar each attach the stowage tray to a base of the support substrate, and a third bar attaches the first bar to a track and a shifting top cover of the support substrate.

In various embodiments, the one or more sliders includes a track and link system.

In various embodiments, a linkage in the track and link system is configured to tilt the reception surface when the stowage tray is at an end of a track in a shifting top cover of the support substrate.

In various embodiments, a projecting lip surrounds at least a portion of an outer perimeter of the stowage tray.

In various embodiments, the stowage tray includes an internal peak configured to orient the mobile device toward a vehicle seat.

In various embodiments, the internal peak divides the stowage tray, and the internal peak is configured to orient a second mobile device toward a second vehicle seat.

In various embodiments, a wireless charger for the mobile device is located behind the reception surface.

In various embodiments, the support substrate includes a top armrest shell and a base armrest shell of a rear armrest, and with both the top armrest shell and the base armrest shell including a cushioned decorative covering.

In various embodiments, the top armrest shell and the base armrest shell are configured to be at least partially recessed into a bench seat.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a stowage tray for a mobile device that has a more integrated and streamlined appearance within a vehicle interior cabin. In an advantageous embodiment, a vehicle interior panel assembly, such as a rear bench seat of a vehicle, includes the stowage tray integrated with an in-vehicle support substrate, such as the rear armrest. The stowage tray can improve the viewing angle of a mobile device retained in the tray, and allows for more intuitive use and deployment. The stowage tray includes a reception surface for the mobile device and one or more sliders configured to slidably attach the tray to the support substrate of the vehicle interior panel assembly. The one or more sliders are configured to tilt the reception surface with respect to the support substrate. This can provide a more elegant appearance, while also improving functionality, such as reducing glare on the mobile device screen.

Figure 1:
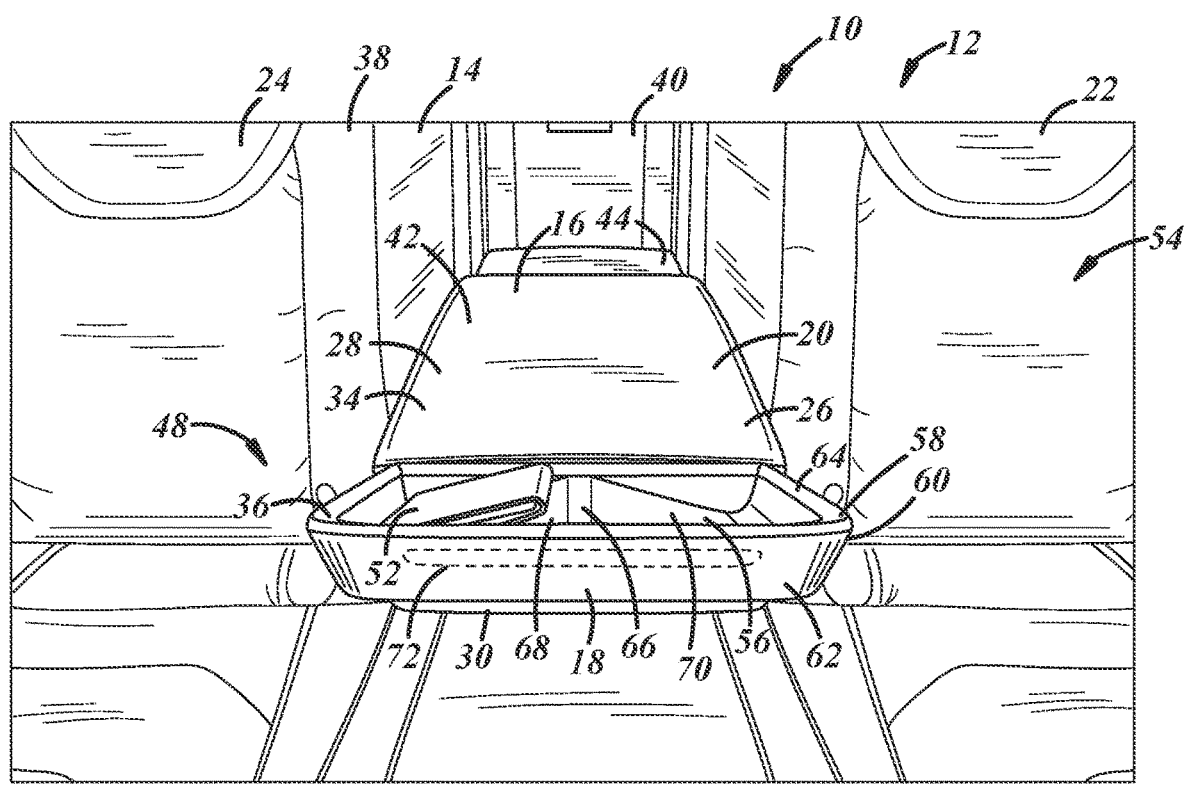
FIG. 1 shows a rear seating area of a vehicle having a stowage tray for a mobile device.

FIG. 1 shows a partial view of an interior cabin 10 for a vehicle 12 having a vehicle interior panel assembly 14 with an in-vehicle support substrate 16 and a stowage tray 18 for a mobile device. The stowage tray 18 is integrated with the in-vehicle support substrate 16, which in this embodiment, is a rear armrest 20. Thus, the interior panel assembly 14 in the illustrated embodiment comprises the rear armrest 20 of the vehicle 12. The armrest 20 is typically employed adjacent individual seats in a vehicle passenger cabin, such as between a driver's side seat 22 and a passenger's side seat 24 in a rear row of seating, but can also, for example, be located in a center console in a front row of seating. Such armrests and consoles can offer a resting surface 26, which may provide a cushioned resting place and/or table-top like surfaces to vehicle occupants. In some embodiments, other features are included, such as extra cushions, storage compartments, cup holders, etc., which help provide other conveniences for vehicle occupants. While the discussion herein is focused on the rear armrest 20 implementation, other interior panels for vehicle components may be integrated with the stowage tray 18 described herein. In the illustrated embodiment, the stowage tray 18 is located at least partially between a top armrest shell 28 and a bottom armrest shell 30. However, in other embodiments, the support substrate 16 could be one or more panels for another armrest, a center console, or the instrument panel, to cite a few examples.

The in-vehicle support substrate 16, which includes the top and bottom armrest shells 28, 30, is comprised of a carrier 32 that is the physical support layer of the panel 14, and a decorative covering 34 covering all or a portion of the carrier 32. The carrier 32 is typically the most rigid of the illustrated layers of the multi-layer assembly and thereby provides structural support for the overlying decorative covering layer(s) at desired locations within the vehicle 12. The carrier 32 has an outer surface 36 that faces towards the interior cabin 10 and toward an inner surface of the decorative covering 34. The inner surface or the outer surface 36 of the carrier 32 can include various bosses, ribs, grooves, etc. that impart structural benefits and/or promote attachment to other components of the vehicle 12, such as to the seat bench as illustrated. Fiberglass-reinforced polypropylene having a thickness of 1.6 mm to 4 mm is one example of a suitable carrier 32, but various other types of materials and material combinations and/or different thickness ranges can be employed in a similar manner (e.g., ABS and/or PC). The support substrate 16 is configured for in-vehicle operation, either by forming a structural component of the vehicle 12, being directly integrated with a vehicle component in the interior cabin 10, or providing some other vehicle-based functionality besides just holding a mobile device.

The support substrate 16 includes the decorative layer 34, which in this embodiment, is a cushioned decorative layer having a foamed or cushioned underlayer. In some embodiments, the decorative layer 34 lines the entirety of the in-vehicle support substrate 16. In other embodiments, such as that illustrated, the decorative layer 34 only covers a portion of the carrier 32. One or more other portions may then be left uncovered, or covered in one or more different decorative layers. The decorative layer 34 can be a single layer, or it may have a multi-layer structure (e.g., a fabric layer with a foamed underlayer). Other materials for the decorative layer are certainly possible, such as fiber-containing resins, leather, or a polymeric skin layer, to cite a few examples. When a resin component is included in the decorative layer, it may be colored or tinted for additional contrast or visual interest. In an advantageous embodiment, the decorative covering 34 on the armrest 20 is also the same as the decorative covering used on the driver side seat 22 and the passenger side seat 24. This provides for a cohesive appearance and seating area, particularly with the bench-style seat illustrated, because the decorative covering 34 on the base armrest shell 30 will match the remainder of the seat bench 38 when the armrest 20 is pushed up and recessed into the stowage area 40.

Adhesive or bonding layers can be included between two or more of the various layers or components of the interior panel assembly 14. Further, other layers may be included in addition to those particularly described, such as one or more protective outer layers on the decorative layer 34, fabric interlayers, conductive electronic layers, or other functional and/or aesthetic layers. As described above, in some embodiments, a foam layer is included to create a cushioned decorative layer 34 to provide a softer feeling surface.

The top armrest shell 28 and the base armrest shell 30 of the in-vehicle substrate 16 are configured to hold the stowage tray 18 at least partially therebetween. Top, as well as bottom or base, are used herein to locate things as being closer to the roof of vehicle 12 or closer to the floor of the vehicle, respectively. In this particular embodiment, the top armrest shell 28 is a two-part component that includes a shifting top cover 42 and a stationary cover 44. Both the shifting top cover 42 and the stationary cover 44 are shorter in length than the base armrest shell 30. This arrangement allows for accessibility of the stowage tray 18 when the stowage tray is in a stowed position 46 (see e.g., FIG. 2). Further, as will be detailed additionally below, the shifting top cover 42 can be used to actuate deployment of the stowage tray 18 so a user can intuitively shift the cover and cause the stowage tray to move from the stowed position 46 into a deployed position 48 (see e.g., FIGS. 1 and 3). To accommodate the stowage tray 18 in the stowed position 46, a stepped opening 50 can be included in the base armrest shell 30. The stepped opening 50 makes the front and sides of the tray 18 visible even when in the stowed position 46, so a passenger such as a ride-share customer, for example, can become more easily aware of its presence.

The stowage tray 18 is integrated within the vehicle interior panel assembly 14 through tiltable attachment to the in-vehicle support substrate 16. The aesthetic of the stowage tray 18 can be strategically designed to better match the overall look and feel of the interior cabin 10. Further, the support substrate 16 and the stowage tray 18 can be precisely built and integrated within the rear armrest 20 in particular to help facilitate intuitive user use. The stowage tray 18 is implemented to facilitate ease of use of a mobile device 52 when in the vehicle 12. The mobile device 52 can be a phone, tablet, or another device that is brought into the vehicle 12 by a user. In the illustrated embodiment, the stowage tray 18 can hold a large tablet or two phones for example, or some other combination of mobile devices depending on the overall size of the tray.

Figure 2:
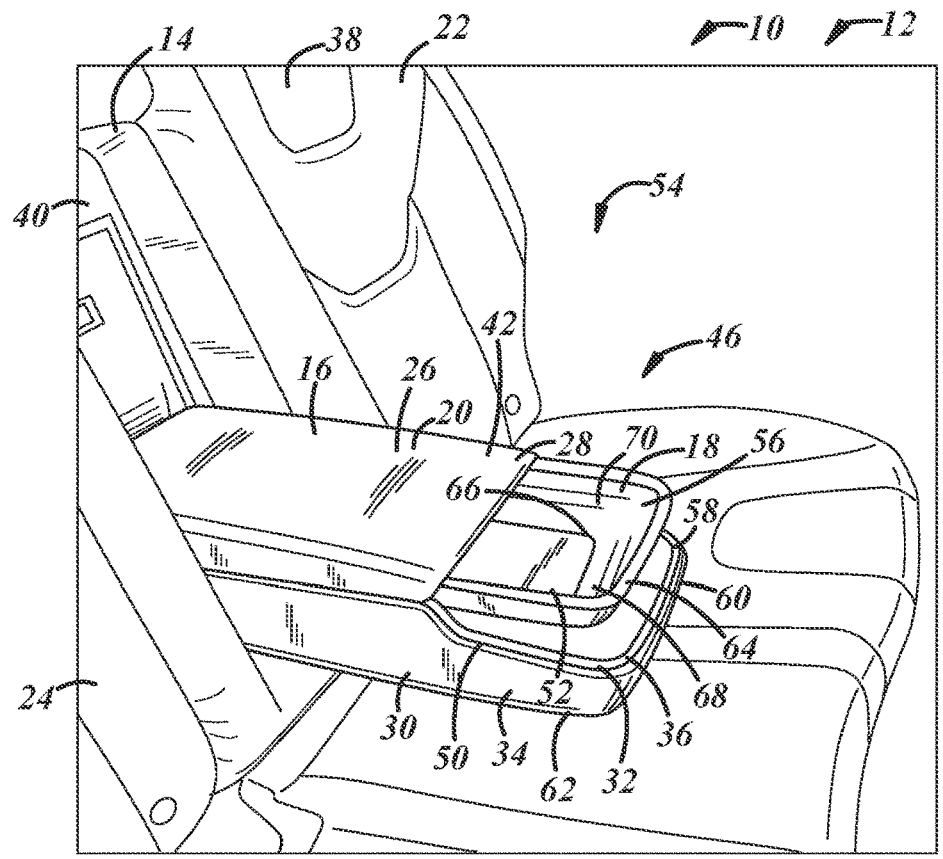
FIG. 2 shows the stowage tray of FIG. 1 in a stowed position.
Figure 3:
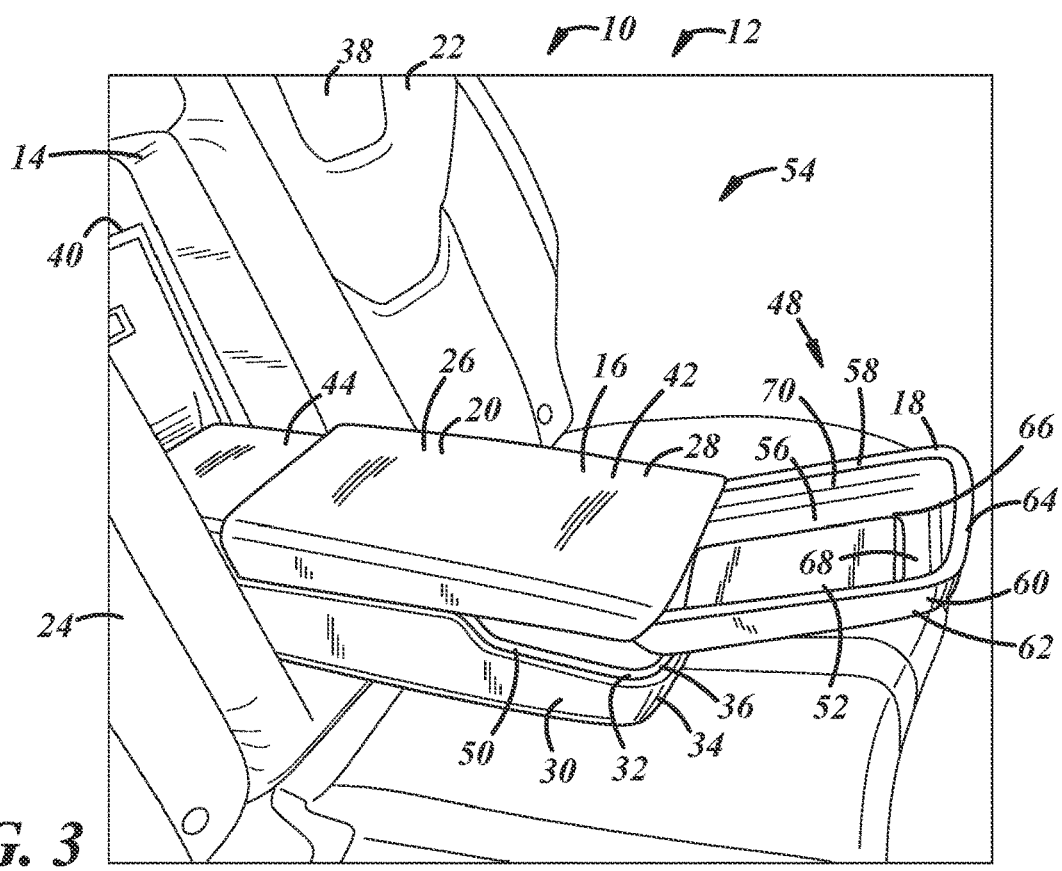
FIG. 3 shows the stowage tray of FIGS. 1 and 2 in a deployed position.

FIGS. 1 and 3 show the stowage tray 18 in the deployed position 48, and FIG. 2 shows the stowage tray in the stowed position 46. The stowage tray 18 is advantageously faced toward a rear seating area 54, so passengers seated in the rear seats 22, 24 along the bench 38 can reach and stow a mobile device 52 easily. In the illustrated embodiments, more than one mobile device 52 can be stowed on the stowage tray 18 at any given time, one for a passenger in the seat 22 and one for a passenger in the seat 24, for example. As detailed further below, the deployed position 48 advantageously tilts the stowage tray 18 with respect to the substrate 16 so as to better position a reception surface 56 for the mobile device 52 more toward a user.

The stowage tray 18 includes an outer perimeter 58 having a projecting lip 60 that surrounds the reception surface 56. The projecting lip 60 helps create a drawer-like body to close around all four sides of the mobile device 52. An outer surface 62 of the projecting lip 60 and the tray 18 can be covered with the decorative layer or covering 34 to improve the overall look and cohesiveness of the rear armrest 20. The projecting lip 60 of the stowage tray 18 can help house or maintain the mobile device 52 in a desirable position. In this embodiment, the stowage tray 18 has a rectangularly shaped outer perimeter 58, which mimics the shape of the end of the armrest 20. This can enhance stowage capability and maximize within vehicle space.

The stowage tray 18 in the illustrated examples has a drawer-like or cradle-like structure to help retain the mobile device 52 on the reception surface 56. The tray 18 can be comprised of a rigid substrate 64 which is then covered by the decorative covering or layer 34. This particular arrangement, where the decorative covering 34 used on the outer surface 62 is the same as the decorative covering used on the in-vehicle support substrate 16, can enhance the aesthetic of the vehicle 12 by making the stowage tray 18 more integrated with the vehicle interior panel assembly 14. The substrate 64 may be made of the same material and in accordance with the teachings relating to the carrier 32, and then covered in a decorative covering. In some implementations, the decorative covering used on the outer surface 62 is not the same as the decorative covering 34 used on the in-vehicle support substrate, but again, matching these decorative coverings can be easier to manufacture and can improve the look and feel of the stowage tray 18. Other decorative layer arrangements, or no decorative layer at all, may be implemented with respect to the tray 18.

The reception surface 56 of the stowage tray 18 defines an area, when in the deployed position 48, that is predominantly exposed to the interior cabin 10 of the vehicle 12. The reception surface 56 is a place where the user can intuitively place the mobile device 52, and it will be generally bounded by the projecting lip 60. In the illustrated embodiments, more particularly visible in FIG. 1, the reception surface 56 includes an internal peak 66 such that the depth of the tray 18 is greatest toward one or more of the seats 22, 24, and smallest at the internal peak. Arranging the internal peak 66 toward the center of the tray 18 can create two mobile device zones 68, 70 on the reception surface 56, each of which being capable of holding a mobile device 52 and orienting the mobile device toward each respective seat 22, 24. The sloped structure of each zone 68, 70 can better orient the mobile device 52 and provide an improved viewing angle for the mobile device when in the deployed position 48. In an advantageous embodiment, the internal peak 66 creates a sloped zone that can tilt the mobile device 52 about 5-15° toward each respective seat 22, 24.

The reception surface 56 and each zone 68, 70 is advantageously a more planar, rigid structure, and can include a decorative or functional covering layer over the substrate 64. The planar structure may facilitate improved wireless charging when a wireless charger 72 is integrated with the armrest and/or the stowage tray 18, for example. In some embodiments, a rubberized decorative layer or gripping material may be used for all or some of the reception surface 56. For example, rubber edges in sections of about 1 mm long could create sidewalls to help reduce lateral movement of the mobile device 52.

In some implementations, the wireless charger 72 can be included behind the reception surface 56 to wirelessly charge the mobile device 52. The range of the wireless charger 72 generally defines the size and shape of the wireless charging area on one or more of the zones 68, 70 (along with other factors, including but not limited to, the ability of the materials of the panel 14 to allow for the transmission of wireless power). The wireless charger 72 can be an integral component of the panel 14 or tray 18, or it may be separately provided beneath the tray, armrest 20, or another panel when installed in the vehicle 12. The wireless charger 72 typically consists of one or more coils and electronics. It may be advantageous to embed the coils into the tray 18 (e.g., into the substrate 64 or in-between layers) so that they are closer to the outer surface, which can increase the size of the wireless charging area on the reception surface 56. The wireless charger 72 can be powered by a vehicle-based power source and may further include haptic feedback capability, such as a piezoelectric oscillator that causes vibrations to be induced in the panel assembly 14 and/or tray 18 when triggered by touch, proximity, or other input. Other features such as additional power sources and/or ambient lighting may be included with the armrest 20 and/or stowage tray 18.

FIGS. 4-7 schematically illustrate the transition between the stowed position 46 for the tray 18 and the deployed position 48, in accordance with two different example embodiments. As shown in these figures, one or more sliders 74 can be included to effectuate the desired translation and tilting of the stowage tray 18. The one or more sliders 74 are configured to tilt and/or translate the stowage tray 18 with respect to the in-vehicle substrate 16. The sliders 74 provide a mechanical advantage (whether by simply reducing friction, or by motorizing the motion of the tray, to cite two examples) and can also directionally impact motion (e.g., translate and tilt as illustrated). A slider 74 is any device, subcomponent, feature, etc. that allows for relative motion between the substrate 16 and the tray 18. Accordingly, a slider 74 may provide for linear translation, rotation, or both translation and rotation. As shown in the figures, the deployed position 48 can advantageously orient a tilting upwards motion of the tray 18 toward the roof or ceiling of the vehicle 12. This is particularly useful for better viewing when the tray 18 is implemented in a rear armrest 20. If, however, the panel assembly 14 and tray 18 is used in a center console, for example, the tilt may be down or toward the vehicle floor to better accommodate the vehicle passengers.

Figure 4:
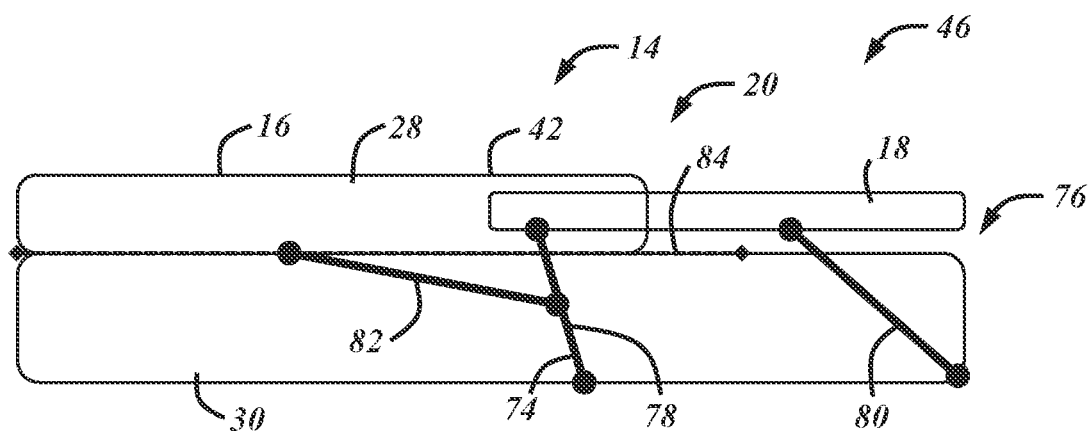
FIG. 4 schematically illustrates one embodiment of a stowage tray in the stowed position.
Figure 5:
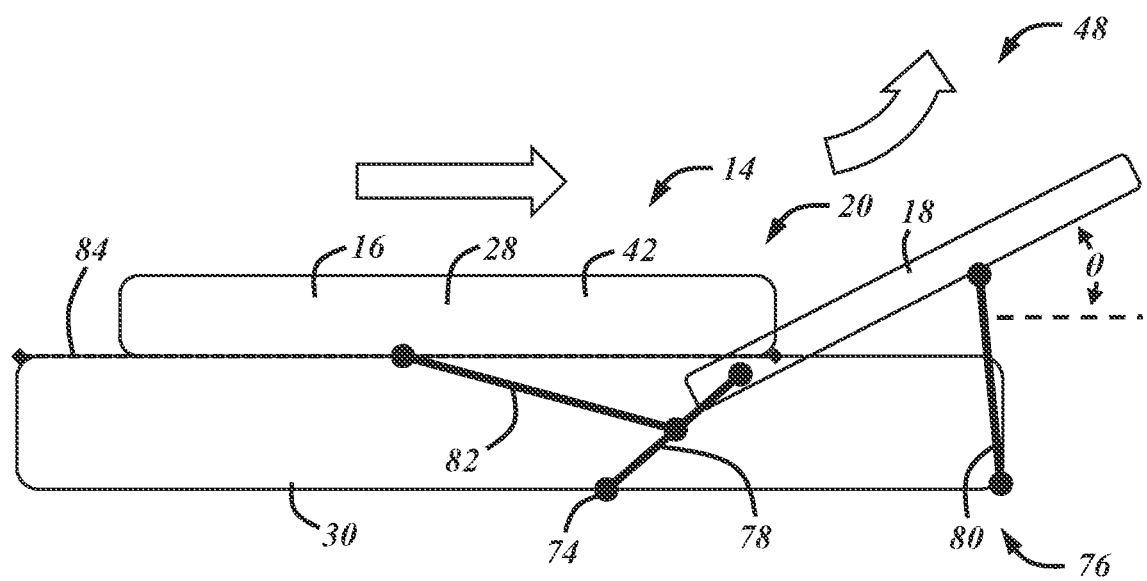
FIG. 5 schematically illustrates the stowage tray of FIG. 4 in the deployed position.

In FIGS. 4 and 5, the sliders 74 create a four-bar linkage 76 that serves to effectuate the translation and tilting of the tray 18 when the shifting top cover 42 is pushed by a user. A first bar 78 couples the tray 18 to the base shell 30, a second bar 80 also couples the tray 18 to the base shell 30, and a third bar 82 couples the first bar to a track 84 between the base and the top shell 28. The base shell 30 acts as the fourth or ground bar of the four-bar linkage 76. The bars of the four-bar linkage 76 are pivotably attached so that when the shifting top cover 42 is pushed, the third bar 82 translates along the track 84, pushing the first bar 78. The translation of the tray 18 then causes the second bar 80 to rotate and effectuate the upward tilting of the tray. In this embodiment, a linear translation movement of the shifting top cover 42 of approximately 30 mm provides for about a 50 mm movement of the tray 18 outward with respect to the substrate 16, along with a tilt angle $\theta$ of about 30°. The tilt angle $\theta$ may be anywhere from about 5-45° and the optimal angle will likely depend on the position of the substrate 16 within the vehicle 12 with respect to the passenger seating. For example, an armrest 20 that is located higher with respect to a seated passenger may have a smaller tilt angle than an armrest that is installed lower in the seat bench. Additionally, one or more friction hinges may be located at pivot points in the four-bar linkage 76 to help maintain positioning at the stowed and/or deployed position 46, 48.

Figure 6:
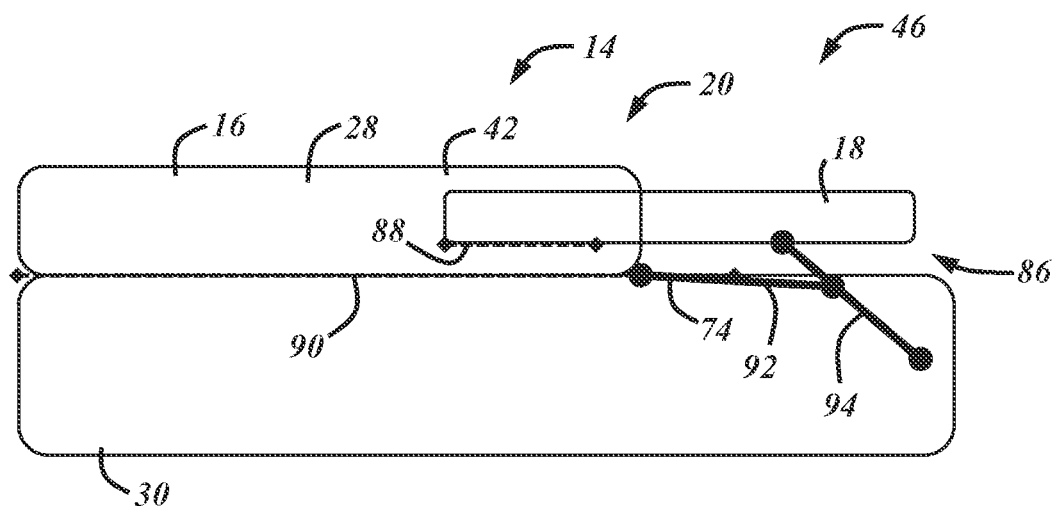
FIG. 6 schematically illustrates another embodiment of a stowage tray in the stowed position.
Figure 7:
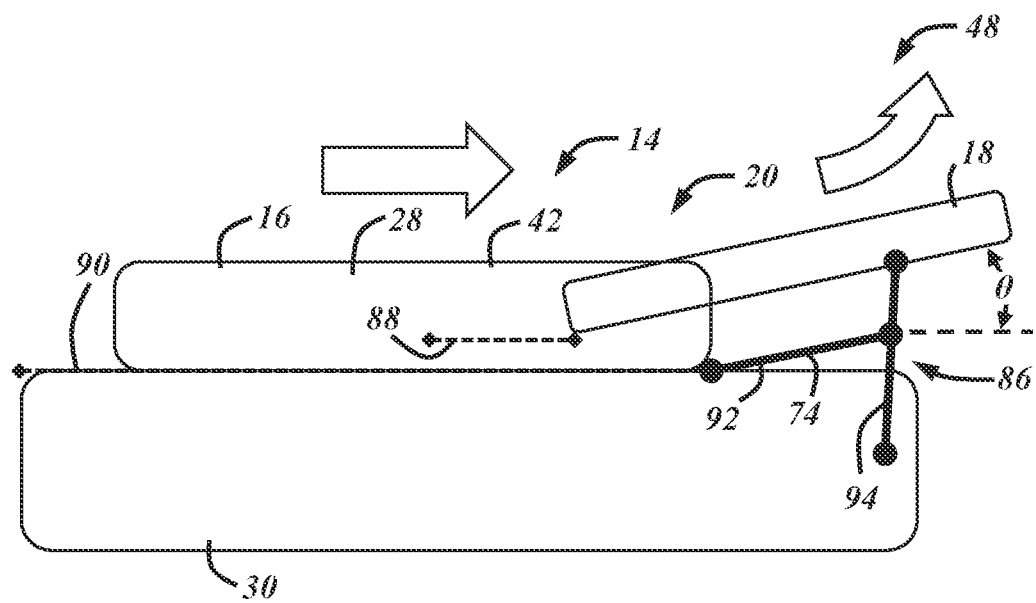
FIG. 7 schematically illustrates the stowage tray of FIG. 6 in the deployed position.

In FIGS. 6 and 7, the sliders 74 comprise a track and link system 86. The track and link system 86 includes a tray track 88 and a linkage track 90. The tray track 88 allows for linear translation of the stowage tray 18, while being stationarily mounted with respect to the shifting top cover 42. As the tray 18 moves along the track 88 and the shifting top cover 42 translates linearly with respect to the bottom shell 30, the linkage 92 is shifted along the linkage track 90 and ultimately, a rotating T-bar 94 facilitates tilting of the stowage tray 18. In this embodiment, a linear translating movement to the shifting top cover 42 of approximately 30 mm provides for about a 50 mm movement of the tray 18 outward with respect to the substrate 16, along with a tilt angle θ of about 12°. This embodiment may be more desirable in vehicle implementations where the armrest 20 is mounted higher and thus a smaller tilt angle is desired. Other types of sliders are feasible as well, beyond just the four-bar linkage 76 and the track and linkage system 86 depicted herein. For example, a curved track could be employed with a friction hinge that helps maintain the tray 18 at a desired tilt angle. A motorized gear and chain mechanism could be used to effectuate the desired translation and/or rotation. Other examples are certainly possible. Moreover, the bars, tracks, and linkages described herein can take a multitude of forms depending on the desired implementation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel assembly, comprising:
a support substrate configured for in-vehicle operation, wherein the support substrate includes a shifting top cover; and
a stowage tray for a mobile device, the stowage tray comprising:
a reception surface for the mobile device; and
one or more sliders configured to attach the stowage tray to the support substrate, wherein the one or more sliders are configured to tilt the reception surface with respect to a stowed position for the stowage tray in the support substrate, and
wherein deployment of the stowage tray is triggered by shifting the shifting top cover.

2. The vehicle interior panel assembly of claim 1, wherein the one or more sliders are configured to translate the stowage tray forward before tilting the stowage tray up with respect to the support substrate.

3. The vehicle interior panel assembly of claim 1, wherein the one or more sliders creates a four-bar linkage.

4. The vehicle interior panel assembly of claim 3, wherein a first bar and a second bar each attach the stowage tray to a base of the support substrate, and a third bar attaches the first bar to a track and the shifting top cover of the support substrate.

5. The vehicle interior panel assembly of claim 1, wherein the one or more sliders includes a track and link system.

6. The vehicle interior panel assembly of claim 5, wherein a linkage in the track and link system is configured to tilt the reception surface when the stowage tray is at an end of a track in the shifting top cover of the support substrate.

7. The vehicle interior panel assembly of claim 1, wherein a projecting lip surrounds at least a portion of an outer perimeter of the stowage tray.

8. The vehicle interior panel assembly of claim 1, wherein the stowage tray includes an internal peak configured to orient the mobile device toward a vehicle seat.

9. The vehicle interior panel assembly of claim 8, wherein the internal peak divides the stowage tray, and wherein the internal peak is configured to orient a second mobile device toward a second vehicle seat.

10. The vehicle interior panel assembly of claim 1, wherein a wireless charger for the mobile device is located behind the reception surface.

11. A rear armrest comprising the vehicle interior panel assembly of claim 1.

12. The rear armrest of claim 11, wherein the support substrate includes a top armrest shell and a base armrest shell, and wherein both the top armrest shell and the base armrest shell include a cushioned decorative covering.

13. The rear armrest of claim 12, wherein the top armrest shell and the base armrest shell are configured to be at least partially recessed into a bench seat.

14. A vehicle interior panel assembly, comprising:
a support substrate configured for in-vehicle operation; and
a stowage tray for a mobile device, the stowage tray comprising:
a reception surface for the mobile device; and
one or more sliders configured to attach the stowage tray to the support substrate,
wherein the one or more sliders creates a four-bar linkage,
wherein a first bar and a second bar each attach the stowage tray to a base of the support substrate, and a third bar attaches the first bar to a track and a shifting top cover of the support substrate, and
wherein the one or more sliders are configured to tilt the reception surface with respect to a stowed position for the stowage tray in the support substrate.

15. A vehicle interior panel assembly, comprising:
a support substrate configured for in-vehicle operation; and
a stowage tray for a mobile device, the stowage tray comprising:
a reception surface for the mobile device; and
one or more sliders configured to attach the stowage tray to the support substrate, wherein the one or more sliders includes a track and link system, wherein a linkage in the track and link system is configured to tilt the reception surface when the stowage tray is at an end of a track in a shifting top cover of the support substrate.

* * * * *